UNITED STATES PATENT OFFICE.

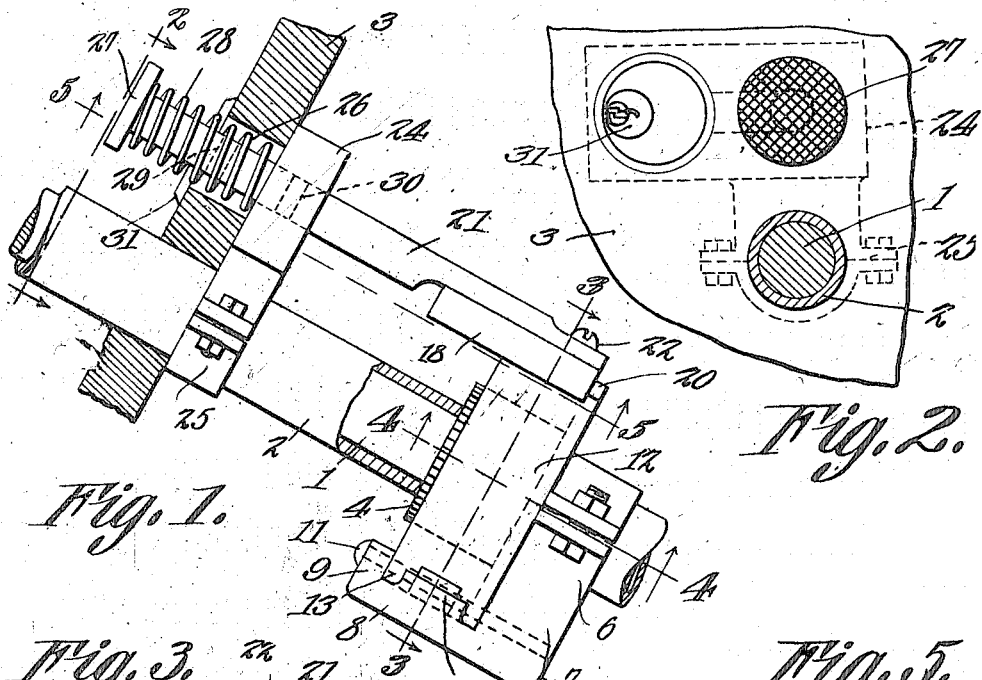

SAMUEL L. TERRY, OF CHICAGO, ILLINOIS.

AUTOMOBILE-LOCK.

1,180,802.

Specification of Letters Patent.  Patented Apr. 25, 1916.

Application filed August 5, 1915. Serial No. 43,837.

*To all whom it may concern:*

Be it known that I, SAMUEL L. TERRY, a citizen of the United States, residing at Chicago, in the county of Cook and State of Illinois, have invented a new and useful Automobile-Lock, of which the following is a specification.

The present invention appertains to locks, and more particularly to locks for automobiles or motor vehicles, the present invention being an improvement over the automobile lock disclosed in my co-pending application Serial No. 31,710 and filed June 2, 1915.

The improved lock is adapted especially for locking the steering shaft or post against rotation when the car is vacated, although the device may be used in connection with any other suitable part of the mechanism for holding said part stationary, whereby the automobile cannot be successfully operated by an unwarranted or maliciously inclined person, the device being readily operable for locking the automobile and for unlocking it by the employment of a proper key.

It is the object of the invention to provide a novel and improved locking device adapted especially for assemblage with the steering shaft or post, whereby said shaft can be locked conveniently and effectively, the device being compact and inexpensive in construction, being readily installed upon various motor vehicles, and being thoroughly practical, convenient and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a side elevation of the improved locking device as applied to the steering shaft, portions being shown in section. Figs. 2, 3, 4 and 5 are sectional views taken on the respective section lines 2—2, 3—3, 4—4 and 5—5 of Fig. 1.

The present locking device is assembled with the steering shaft or post 1 of an automobile or motor vehicle, its tubular casing 2, and the foot board 3 through which the casing 2 extends, it being understood, however, that the device may be employed in various capacities for which it is adapted.

In carrying out the invention, the casing 2 is divided below or in front of the foot board 3, and a wheel 4 having a toothed periphery is fitted upon the shaft 1 between the adjacent ends of the sections of the casing 2, the wheel 4 being preferably fixed to the shaft 1 by means of a set screw 5 threaded through the wheel 4 and impinging against the shaft 1. It is the wheel or member 4 that is gripped or held to prevent the turning of the shaft 1 when the car is vacated, in order that the steering gear cannot be operated successfully unless the shaft 1 can be released.

A clamp 6 tightly embraces the casing 2 immediately below or in front of the wheel 4, and is provided with a downwardly projecting bracket 7 of L-shape, and having the rearwardly projecting arm 8 below the wheel 4. This arm 8 has an upwardly projecting or upturned ear or lug 9 at its free end, and the arm 8 is provided with a longitudinal channel or recess 10 extending from the ear 9 to the arm of the bracket 7 which is fixed to the clamp 6. A bolt, rod or other pivot element 11 is engaged through the ear 9 and last mentioned arm of the bracket 7 above and parallel with the channel 10. Carried by the bracket 7 is a pair of curved or arcuate jaws 12 disposed at opposite sides of the wheel 4 and having hinge butts 13 at their adjacent ends pivotally engaging the bolt or pin 11 within the channel 10 to pivot the jaws 12 to the bracket to swing in a plane arranged at right angles relative to the axis of the shaft 1. The jaws 12 are thus swingable toward and away from the wheel 4 at the opposite sides thereof, the separation of the jaws 12 being limited by the stops 14 of the arm 8 at the opposite sides of the channel 10. This prevents the excessive movement of the jaws 12 away from the wheel 4.

The jaws 12 are provided between their ends and upon their inner sides with teeth 15 engageable with the teeth of the wheel 4, whereby when the jaws are moved toward one another to grip the wheel 4, the wheel is positively held against rotation. The teeth 15 are spaced from the lower or forward edges of the jaws 12, and said edges of the jaws have inturned lips or flanges 16 upon which an arcuate leaf spring 17 is seated between said lips and the teeth 15, so that the spring is held in place between the jaws. The terminals of the spring 17 bear against the jaws, thereby tending to separate them.

In order to swing the jaws 12 toward and away from one another, a cam block 18 is slidably engaged with the free ends of the jaws 12, and is movable along a line parallel with the axis of the shaft 1. This block 18 has a pair of diverging grooves 19 in its lower surface receiving the free ends 20 of the jaws 12, the grooves 19 and free ends 20 of the jaws 12, being of angular or L-shaped cross section, whereby the block 18 is held assembled with the jaws, and allowing the block 18 to slide longitudinally. When the block 18 is slid longitudinally, the free ends of the jaws 12 working in the diverging cam grooves or slots 19 will cause the jaws to swing toward or away from one another, according to the direction in which the block 18 is moved. The grooves 19 diverge downwardly or forwardly, so that when the block 18 is moved forwardly or downwardly, the jaws 12 are swung toward one another, and conversely, when the block 18 is moved upwardly or rearwardly, the jaws 12 are swung apart.

The block 18 is slid by means of a stem or shank 21 which has its lower or forward end attached to the block 18 by means of a screw or other suitable securing means 22, and the stem 21 is slidable through the aperture 23 of a key controlled lock 24 disposed immediately below or in front of the foot board 3. The lock 24 has a clamp 25 embracing the casing 2 immediately in front or below the foot board 3, and the stem 21 projects rearwardly or upwardly through an aperture or opening 26 provided in the foot board. The rear or upper end of the stem 21 has a foot piece 27, which may be depressed by the foot of the operator for moving the block 18 forwardly to swing the jaws 12 to grip the wheel 4.

It is preferable, although not necessary, to provide a coiled wire expansion spring 28 upon the stem 21 between the lock 24 and foot piece 27, so that when the stem 21 is released, it will be thrown rearwardly under the influence of the spring 28 to separate the jaws 12.

The lock 24 may be of any suitable character, various prevailing locks being readily used, and the locks 24 of various automobiles may have any number of key changes, to prevent the operation of one lock by the key of another. The lock 24 is adapted for locking the stem or spindle 21 to prevent the movement thereof especially when the stem 21 is moved for causing the jaws 12 to grip the wheel 4. The stem 21 is provided with a pair of notches 29 and 30, and the lock 24 is provided with a key barrel 31 projecting through the foot board 3 so as to be accessible from the operator's or driver's seat. The lock 24 has a spring pressed bolt 32 adapted to be retracted when a proper key is inserted into the barrel 31 and turned, which is common in ordinary locks. When the stem 21 is moved rearwardly, to separate the jaws 12, the bolt 32 shoots into the notch 30 for preventing the locking of the automobile, and when the stem 21 is moved forwardly, the bolt 32 is engageable in the notch 29 for preventing the unlocking of the automobile without the use of a proper key. The notch 30 may be eliminated, however, when it is not desired to lock the jaws 12 in open or separated position, but the use of the notch 30 is desirable for preventing the accidental or unwarranted locking of the steering shaft for any reason whatsoever.

The device may be readily assembled with or installed upon the respective parts of an automobile, and it will be noted that the greater portion of the device is concealed below the foot board, so as to be out of the way and inconspicuous, the key barrel 31 and foot piece 27 being the only parts of the device which are visible above the foot board.

The operation of the device will suggest itself from the foregoing, but briefly stated is as follows: When the automobile is being used, the stem 21 is moved rearwardly under the influence of the spring 28 so that the cam block 18 separates the jaws 12 to release the wheel 4. The shaft 1 can then be rotated or turned freely for steering the vehicle. When it is desired to lock the vehicle, when the vehicle is vacated, the stem 21 is depressed by applying the foot to the foot piece 27, thereby forcing the block 18 forwardly, and moving the jaws 12 together forcibly so as to grip the wheel 4 therebetween. The bolt 32 shoots into the notch 29, thereby preventing the retraction of the stem 21, unless a proper key is inserted into the barrel 31. It will therefore be impossible for any one not possessing the proper key, to release the steering shaft 1, so that the vehicle can be successfully operated. However, when the bolt 32 is retracted by the employment of a proper key, the stem 21 is released, and will spring rearwardly to separate the jaws 12, thereby allowing the automobile to be operated without interference. If the notch 30 is used, the bolt 32 engages the same for holding the jaws 12 separated, to prevent the accidental movement of the stem 21 when the car is running.

The advantages and attributes of the device will be obvious from the foregoing, taken in connection with the drawing, without lengthy comment being necessary.

Having thus described the invention, what is claimed as new is:

1. In a locking device, a bracket, a pair of jaws pivoted thereto, and a slidable cam member having diverging cam portions engaging the jaws for swinging them toward and away from one another to grip and release the member therebetween.

2. In a locking device, a bracket, a pair of jaws pivoted thereto, and a cam member slidably engaging the free ends of the jaws for swinging the jaws toward and away from one another, the jaws having gripping means between the bracket and cam member.

3. In a locking device, a bracket, a pair of jaws pivoted thereto, and a cam member movable parallel with the pivot of the jaws and having diverging cam portions, the free ends of the jaws having portions engaging said cam portions, the jaws having gripping means between the bracket and cam member.

4. In a locking device, a bracket, a pair of jaws pivoted thereto, a cam member slidably engaging the free ends of the jaws for swinging the jaws toward and away from one another, a stem attached to said cam member for sliding it, and means for locking said stem to prevent the movement of the cam member.

5. The combination with a shaft and its casing, of a wheel carried by the shaft, a bracket attached to the casing, a pair of jaws pivoted to the bracket and disposed at the opposite sides of said wheel, and a cam member slidably engaging the free ends of the jaws for swinging said jaws toward and away from one another to grip and release said wheel.

6. The combination with a shaft and its casing, of a wheel carried by the shaft, a bracket attached to the casing, a pair of jaws pivoted to the bracket and disposed at the opposite sides of said wheel, a lock carried by the casing, and a stem slidable through the lock to be held thereby and operatively connected to said jaws for swinging them toward and away from one another to grip and release said wheel.

7. The combination with a shaft and its casing, of a wheel carried by the shaft, a bracket attached to the casing, a pair of jaws pivoted to the bracket and disposed at the opposite sides of said wheel, a lock carried by the casing, a stem slidable through the lock to be held thereby, and a wedge member attached to said stem and slidably engaging the free portions of the jaws for swinging said jaws toward and away from one another to grip and release said wheel.

8. The combination with a shaft and its casing, of a clamp embracing the casing and having an L-shaped bracket, a wheel carried by the shaft, one arm of said bracket being disposed parallel with the axis of the shaft at one side of the wheel, a pair of jaws pivoted to said arm and disposed at the opposite sides of said wheel, and means connected to said jaws for swinging them toward and away from one another to grip and release said wheel.

9. The combination with a shaft and its casing, of a clamp embracing the casing and having an L-shaped bracket, a wheel carried by the shaft, one arm of said bracket being disposed parallel with the axis of the shaft at one side of the wheel, a pair of jaws pivoted to said arm and disposed at the opposite sides of said wheel, and a wedge block slidably engaging the free ends of the jaws for swinging them toward and away from one another to grip and release said wheel.

10. The combination with a shaft and its casing, of a clamp embracing the casing and having an L-shaped bracket, a wheel carried by the shaft, one arm of said bracket being disposed parallel with the axis of the shaft at one side of the wheel, a pair of jaws pivoted to said arm and disposed at the opposite sides of said wheel, a lock having a clamp embracing said shaft, and a stem slidable through the lock to be held thereby and operatively connected to said jaws for swinging them toward and away from one another to grip and release said wheel.

11. The combination with a shaft and its casing, of a clamp embracing said casing and having an L-shaped bracket, a wheel carried by the shaft, one arm of said bracket being disposed parallel with the axis of the shaft at one side of the wheel, a pair of jaws pivoted to said arm and disposed at the opposite sides of said wheel, a lock having a clamp embracing said shaft, a stem slidable through said lock to be held thereby, and a wedge block attached to the stem and slidably engaging the free portions of the jaws for swinging the jaws toward and away from one another to grip and release said wheel.

In testimony that I claim the foregoing as my own, I have hereto affixed my signature in the presence of two witnesses.

SAM'L. L. TERRY.

Witnesses:
 IVY E. SIMPSON,
 HELEN ZIMMERMAN,